(12) United States Patent
Ishii et al.

(10) Patent No.: US 8,058,556 B2
(45) Date of Patent: Nov. 15, 2011

(54) FLUORINATED COPOLYMER, ELECTRIC WIRE, AND METHOD FOR PRODUCTION OF THE ELECTRIC WIRE

(75) Inventors: Kenji Ishii, Settsu (JP); Hideki Kono, Settsu (JP); Yasuyuki Yamaguchi, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 288 days.

(21) Appl. No.: 12/446,185

(22) PCT Filed: Oct. 19, 2007

(86) PCT No.: PCT/JP2007/070444
§ 371 (c)(1),
(2), (4) Date: Apr. 17, 2009

(87) PCT Pub. No.: WO2008/047906
PCT Pub. Date: Apr. 24, 2008

(65) Prior Publication Data
US 2010/0314153 A1 Dec. 16, 2010

(30) Foreign Application Priority Data
Oct. 20, 2006 (JP) .................................. 2006-286562

(51) Int. Cl.
*H01B 7/00* (2006.01)
(52) U.S. Cl. ........................... 174/110 R; 174/110 SR
(58) Field of Classification Search ....... 174/110 R–110 PM, 113 R, 120 R, 120 SC, 36; 428/364, 428/400, 399, 394, 422, 421
See application file for complete search history.

(56) References Cited

U.S. PATENT DOCUMENTS

| | | | | |
|---|---|---|---|---|
| 3,579,370 A | * | 5/1971 | Punderson et al. | 428/422 |
| 4,935,467 A | * | 6/1990 | Cheng et al. | 525/199 |
| 5,580,654 A | * | 12/1996 | Cotter et al. | 428/375 |
| 6,077,609 A | * | 6/2000 | Blong et al. | 428/412 |
| 6,124,045 A | * | 9/2000 | Soda et al. | 428/500 |
| 6,479,143 B1 | * | 11/2002 | Tamaru et al. | 428/364 |
| 6,737,490 B2 | | 5/2004 | Sumi et al. | |
| 2002/0002216 A1 | * | 1/2002 | Tooley | 523/210 |
| 2003/0198771 A1 | * | 10/2003 | Fukushi et al. | 428/36.91 |
| 2004/0214972 A1 | | 10/2004 | Kurihara et al. | |
| 2005/0288465 A1 | | 12/2005 | Aida et al. | |
| 2007/0149734 A1 | * | 6/2007 | Sakakibara et al. | 526/247 |

FOREIGN PATENT DOCUMENTS

| | | |
|---|---|---|
| EP | 1 262 496 A1 | 12/2002 |
| EP | 1612236 A1 | 1/2006 |
| JP | 53-042282 A | 4/1978 |
| JP | 07-041522 A | 2/1995 |
| JP | 8109225 A | 4/1996 |
| JP | 10-17621 A * | 1/1998 |
| JP | 10-017621 A | 1/1998 |
| JP | 1017621 A | 1/1998 |
| JP | 200253620 A | 2/2002 |
| JP | 2003-246823 A | 9/2003 |
| JP | 2005298659 A | 10/2005 |
| JP | 2005320497 A | 11/2005 |
| JP | 2006-045515 A | 2/2006 |
| WO | 01/36504 A1 | 5/2001 |
| WO | WO01/36504 A * | 5/2001 |
| WO | 200552015 A1 | 6/2005 |

* cited by examiner

*Primary Examiner* — William Mayo, III
(74) *Attorney, Agent, or Firm* — Sughrue Mion, PLLC

(57) ABSTRACT

A fluorocopolymer having a tetrafluoroethylene-derived constituent unit as essential unit, and hexafluoropropylene-derived constituent unit and/or perfluoro(alkyl vinyl ether)-derived constituent unit, wherein, when the fluorocopolymer is molded into a film, the film has not more than 10000 fisheyes capable of enclosing a square with a side length of 44 μm and incapable of enclosing a square with a side length of 178 μm per 100 g and not more than 1000 fisheyes capable of enclosing a square with a side length of 178 μm per 100 g.

10 Claims, No Drawings

FLUORINATED COPOLYMER, ELECTRIC WIRE, AND METHOD FOR PRODUCTION OF THE ELECTRIC WIRE

TECHNICAL FIELD

The present invention relates to a fluorocopolymer, an electric wire and a method of production thereof.

BACKGROUND ART

Personal computers, mobile phones, video cameras, GPS devices and other information and telecommunication devices as well as endoscopes and other medical devices are becoming smaller with the advances in technology and, accordingly, electric wires used therein are always required to be made thinner and, for example, thin wires, such as AWG 40 and thinner wires, are currently required. For use in wiring in parts subject to bending in notebook-size personal computers and mobile phones, in particular, they are required to have performance characteristics enabling them to be used in severer environments.

With the reduction in electric wire thickness, electric wire coating/covering molding becomes difficult and, therefore, fluororesin coating materials are required to have improved moldability, and novel tasks are imposed on products after electric wire covering as well. The problems encountered on the occasion of electric wire covering molding, among others, are the roughness of the covering surface due to small protrusions appearing on the covering surface and the melt fracture occurring on the occasion of drawing the resin onto the conductor. These not only lower the yield in electric wire covering molding but also impair the quality of final products. As regards the products after electric wire covering, there are problems about crack resistance and about stripping properties of the covering which are required on the occasion of wiring. As the conducting wire becomes thinner, these problems become severer.

Concerning the prevention of melt fracture, a fluororesin which will not cause covering breakage when core wires with a diameter of 0.05 to 0.07 mm are coated under specific conditions has been proposed (cf. e.g. Patent Document 1).

Tetrafluoroethylene [TFE]- and perfluoro (alkyl vinyl ether) [PAVE]-based TFE copolymers containing 10 to 100 unstable terminal groups per $10^6$ carbon atoms have been proposed as fluorocopolymers improved in crack resistance (cf. e.g. Patent Document 2 and Patent Document 3).

A TFE/PAVE copolymer showing a volume flow rate of 0.5 to 100 (mm$^3$/second) (cf. e.g. Patent Document 4) and a TFE/PAVE copolymer showing a melt flow rate within the range of 35 to 60 g/10 minutes (cf. e.g. Patent Document 5) have been proposed as fluorocopolymers capable of giving moldings excellent in surface smoothness and crack resistance.

Patent Document 1: International Publication WO 2005/052015

Patent Document 2: Japanese Kokai Publication 2005-298659

Patent Document 3: Japanese Kokai Publication 2005-320497

Patent Document 4: Japanese Kokai Publication H08-109225

Patent Document 5: Japanese Kokai Publication 2002-53620

DISCLOSURE OF INVENTION

Problems which the Invention is to Solve

In view of the above-discussed state of the art, it is an object of the present invention to provide a fluorocopolymer with which the frequency of molding faults in electric wire covering molding can be reduced and which can give electric wires improved in crack resistance. Another object of the invention is to provide a method of producing electric wires which can markedly reduce the incidence of molding faults and, an electric wire improved in crack resistance.

Means for Solving the Problems

Present invention is a fluorocopolymer comprising tetrafluoroethylene-derived constituent unit as essential unit, and hexafluoropropylene-derived constituent unit and/or perfluoro (alkyl vinyl ether)-derived constituent unit, wherein, when the fluorocopolymer is molded into a film, the film has not more than 10000 fisheyes capable of enclosing a square with a side length of 44 μm and incapable of enclosing a square with a side length of 178 μm per 100 g and not more than 1000 fisheyes capable of enclosing a square with a side length of 178 μm per 100 g.

Present invention is a method of producing electric wires, which comprises extrusion-molding the fluorocopolymer mentioned above on a cable conductor.

The electric wire having a covering made of the fluorocopolymer mentioned above.

The fluorocopolymer of the invention, when molded into a film, followed by counting of fisheyes occurring on the film, gives not more than 10000 fisheyes capable of enclosing a square with a side length of 44 μm and incapable of enclosing a square with a side length of 178 μm per 100 g and not more than 1000 fisheyes capable of enclosing a square with a side length of 178 μm per 100 g.

The fluorocopolymer of the invention, wherein the number of fisheyes capable of enclosing a square with a side length of 44 μm and incapable of enclosing a square with a side length of 178 μm is not greater than 1000 per 100 g and the number of fisheyes capable of enclosing a square with a side length of 178 μm is not greater than 1000 per 100 g.

The art has so far encountered molding faults in electric wire covering molding, such as the occurrence of melt fracture on the occasion of drawing the fluorocopolymer onto the cable conductor and the occurrence of surface roughness due to small protrusions generated on the covering material obtained from the fluorocopolymer; those problems become more serious as the electric wire cable conductor becomes thinner. These not only lower the yield in electric wire covering molding but also lower the crack resistance of electric wires after covering. The present inventors found that fisheyes act as one of the causes therefor. Thus, the fluorocopolymer of the invention can reduce the incidence of molding faults in electric wire covering molding and at the same time can provide product electric wires with improved crack resistance as a result of a reduced number of fisheyes.

The fisheyes are a kind of contamination occurring as impurities in a fluorocopolymer due to large differences in molecular weight and composition from the desired fluorocopolymer and, in film molding, they are visually confirmable as white opaque parts or protrusions. In the case of a fluorocopolymer, in particular, components abnormally high in molecular weight, components high in TFE content, and/or components formed by thermal recombination or crosslinking during molding, among others, are causative of fisheyes.

Therefore, the appearance of fisheyes can be reduced by preventing the formation of those components.

The number of fisheyes is determined herein by the following method. A fluorocopolymer is molded using a ø20 extruder (product of Tanabe Plastics Machinery) equipped with a T die under the following conditions: preset temperatures: C1: 350° C., C2: 390° C., C3: 390° C., D: 390° C.; screwrevolution speed: 15 rpm; extrusion rate: about 3 m/min. Sampling is started 30 minutes after the start of molding, and film samples with a width of 70 mm, a thickness of 0.05 to 0.06 mm (middle portion) and a length of 5 m are collected.

The film obtained is masked on both ends and the 50-mm-wide middle portion is subjected to fisheye detection using a optical surface inspection apparatus (product of Mitsubishi Rayon: LSC-3100V).

The film molding and measurement are carried out in a class 1000 clean room [not more than 1000 fine particles not smaller than 0.5 µm per ft$^3$ (cubic foot) of air] with greatest care to avoid contamination with such contamination as dust or refuse.

The fisheyes so referred to herein are those parts which are detected as parts showing a transmittance lower than 80%, as detected by the detector disposed 292 mm vertically above the film, against light emitted from the lamp disposed, on the opposite side, relative to the detector, of the film, 300 mm below the film but which are not detected as parts showing a transmittance lower than 80% by the detector disposed 292 mm vertically above the film when light is emitted from the lamp disposed, on the opposite side relative to the detector, 50 mm below the film.

The fisheyes thus detected are divided into the above-mentioned two size classes for counting, and the numbers of fisheyes existing on the film are converted to the numbers per 100 g.

The fluorocopolymer of the invention comprises tetrafluoroethylene [TFE]-derived constituent unit as essential unit, and hexafluoropropylene [HFP]-derived constituent unit and/or perfluoro(alkyl vinyl ether) [PAVE]-derived constituent unit.

The above-mentioned TFE-derived constituent unit (TFE unit), HFP-derived constituent unit (HFP unit) and PAVE-derived constituent unit (PAVE unit) are derived from TFE, HFP and PAVE, respectively, and each constitutes a part of the molecular structure of the fluorocopolymer. The TFE unit, for instance, is represented by $-(CF_2CF_2)-$.

The above-mentioned PAVE is not particularly restricted but includes, among others, perfluoro (methyl vinyl ether) [PMVE], perfluoro (ethyl vinyl ether) [PEVE], perfluoro (propyl vinyl ether) [PPVE] and perfluoro(butyl vinyl ether) [PBVE]; among them, PPVE is preferred from the excellent thermal stability viewpoint.

The fluorocopolymer of the invention is preferably a copolymer comprising 90 to 80% by mass of TFE units and 10 to 20% by mass of HFP units, a copolymer comprising 97 to 90% by mass of TFE units and 3 to 10% by mass of PAVE units, or a copolymer comprising 92 to 75% by mass of TFE units, 7 to 20% by mass of HFP units and 0.1 to 5% by mass of PAVE units.

When the HFP unit and/or PAVE unit content in the fluorocopolymer of the invention is low, the electric wires obtained may possibly be insufficient in crack resistance. When the HFP unit and/or PAVE unit content is excessive, the thermal stability tends to become decreased.

When the fluorocopolymer of the invention is comprising TFE units and HFP units, it is more preferably one having a TFE unit:HFP unit mass ratio (the sum of all units being 100) of (88 to 85):(12 to 15).

When the fluorocopolymer of the invention is comprising TFE units and PAVE units, it is more preferably one having a TFE unit:PAVE unit mass ratio (the sum of all units being 100) of (95 to 92):(5 to 8).

When the fluorocopolymer of the invention is comprising TFE units, HFP units and PAVE units, it is more preferably one having a TFE unit:HFP unit:PAVE unit mass ratio (the sum of all units being 100) of (90.9 to 75):(9 to 20):(0.1 to 5).

When the PAVE units include two or more unit species, for example PMVE units and PPVE units, the PAVE unit mass in the above mass ratio is based on the total mass of the two or more unit species.

In the present specification, the above-mentioned mass ratio is the ratio obtained by measuring the TFE unit, HFP unit and PAVE unit contents, respectively, using an NMR spectrometer (product of Bruker BioSpin, AC300) or an infrared absorption spectrometer (product of Perkin-Elmer, model 1760).

The fluorocopolymer of the invention preferably has a melt flow rate [MFR] of not lower than 25 (g/10 minutes) but lower than 48 (g/10 minutes). For attaining crack resistance and other physical characteristics required in electric wires, it is desired that it have a somewhat high molecular weight reflected by an MFR lower than 48 (g/10 minutes). For producing very thin electric wires, however, it is preferred that the melt viscosity be low; therefore, it becomes necessary that the MFR be high, hence the molecular weight be lowered. When the molecular weight of a resin is reduced, high-molecular-weight molecules in the resin generally behave as contamination relatively easily, increasing the possibility of their forming fisheyes and thus rendering the problem of fisheye-due molding faults more significant. According to the invention, however, the problem of fisheye-due molding faults is alleviated by reducing the fisheye-causing matter content and, therefore, molding faults can be suppressed even when the MFR is within the above range. When the MFR is lower than 25 (g/10 minutes), it is difficult to produce desired thin electric wires using the corresponding fluorocopolymer in covering molding and the covering obtained may be poor in surface smoothness. When the MFR is 48 (g/10 minutes) or higher, the problem of fisheye-due molding faults becomes more serious and the crack resistance of the covering obtained may become insufficient. More preferably, the MFR is not lower than 30 (g/10 minutes), still more preferably not lower than 35 (g/10 minutes), and is more preferably not higher than 45 (g/10 minutes).

The MFR so referred to herein is measured using a melt index tester conforming to ASTM D 1238-98 or JIS K 7210; about 6 g of each sample is extruded through a die with a diameter of 2.1 mm and a length of 8 mm at a temperature of 372° C. under a load of 5 kg (sum of the piston and the weight).

The fluorocopolymer of the invention is one having a reduced fisheyes-causing matter content and, as the method of reducing the fisheye-causing matter content, there may be mentioned, among others, fluorination of fluorocopolymer termini, application of an antiadhesive agent to the polymerization vessel, polymerization initiator feeding into the liquid phase, melt-pelletization using a twin-screw extruder, and use of a fine-meshed screen or filter on the occasion of melt-pelletization. The fisheye-causing matter content can be reduced by appropriately combining necessary means selected from among such methods.

The number of terminal groups other than —$CF_3$ groups in the fluorocopolymer of the invention is preferably not greater than 50 per $10^6$ carbon atoms. When the number of terminal groups other than —$CF_3$ groups is within the above range, thermal decomposition-due foaming will not occur in the extrusion molding step, hence the incidence of molding faults can be reduced; further, fisheye-causing mutual recombination (crosslinking) of fluorocopolymer molecules in the step of extrusion molding will not occur, so that the number of fisheyes can be reduced. Furthermore, the electric wires obtained can show improved stripping properties and it becomes possible to obtain electric wires facilitating wiring works even when they are thin wires. The number of terminal groups other than —$CF_3$ groups is more preferably not greater than 30, still more preferably not greater than 9, per $10^6$ carbon atoms.

The "terminal groups other than —$CF_3$ groups" so referred to herein include at least one species selected from the group consisting of —COOH, —$CH_2OH$, —COF, —$CONH_2$ and —$COOCH_3$ possibly occurring in the main chain and side chains of the fluorocopolymer of the invention. The terminal groups other than —$CF_3$ groups can be reduced in number or eliminated by the fluorination treatment mentioned below or by initiator species selection.

The method of fluorination treatment is not particularly restricted but mention may be made of the method comprising exposing the fluorocopolymer to a fluorine radical source generating fluorine radicals under the fluorination treatment conditions. As the fluorine radical source, there may be mentioned fluorine gas and, further, $CoF_3$, $AgF_2$, $UF_6$, $OF_2$, $N_2F_2$, $CF_3OF$, and halogen fluorides such as $IF_5$ and $ClF_3$, for instance.

When the fluorocopolymer of the invention is brought into contact with such fluorine radical source as mentioned above for the above fluorination treatment, the above-mentioned terminal groups other than —$CF_3$ groups are converted to —$CF_3$ groups.

When the method of bringing into contact with fluorine gas is employed as the above fluorination treatment, it is preferred from the safety viewpoint that fluorine gas be mixed with an inert gas, thus diluted to 5 to 30% by mass, preferably 15 to 25% by mass, and then used. As the inert gas, there may be mentioned nitrogen gas, argon gas, helium gas and so forth.

The above fluorination treatment is preferably carried out at a temperature lower than the melting point of the fluorocopolymer, generally at 250° C. or below, more preferably at room temperature to 220° C. The fluorination treatment is carried out at a pressure of 50 to 1010 kPa (=0.5 to 10 atm.) generally for 1 to 30 hours, preferably for 2 to 20 hours.

The above fluorination treatment can be carried out either continuously or batchwise. The apparatus to be used in the above fluorination treatment can be properly selected from among such stationary reactors as tray reactors and cylindrical reactors; reactors equipped with a stirrer; such vessel rotating (tumbling) reactors as rotary kilns, double cone reactors and V-shaped blenders; vibrating reactors; various fluidized bed reactors such as agitated fluidized bed reactors; and so forth.

The "number of terminal groups other than —$CF_3$ groups" so referred to herein is the value determined by subjecting a 0.25 to 0.3-mm-thick film prepared from the fluorocopolymer in the form of a powder by 30 minutes of compression molding at 350° C. to infrared absorption spectrometry using FT-IR Spectrometer 1760X (product of Perkin Elmer) according to the method described in Japanese Kokai Publication 2005-298659. The correction factors are determined from infrared spectra of model compounds for calculating the numbers of terminal groups per $10^6$ carbon atoms.

The infrared absorption spectra mentioned above are measured and analyzed using FT-IR Spectrometer 1760X (product of Perkin-Elmer) and Perkin Elmer Spectrum for Windows (registered trademark) version: 1.4C.

Usable as the method of producing the fluorocopolymer of the invention are such conventional methods of polymerization as emulsion polymerization, suspension polymerization, solution polymerization and bulk polymerization. From the industrial viewpoint, however, the use of suspension polymerization or emulsion polymerization is preferred.

The fluorocopolymer of the invention is preferably one obtained by carrying out the polymerization in a polymerization vessel coated in advance with an antiadhesive agent. The preliminary antiadhesive agent application can inhibit the polymerization from proceeding on the polymerization vessel side wall portion in contact with the gaseous phase and, therefore, the formation of components greatly differing in molecular weight and composition from the desired fluorocopolymer can be suppressed, so that the fluorocopolymer can be obtained in a form giving a reduced number of fisheyes. The antiadhesive agent mentioned above is not particularly restricted but there may be mentioned, for example, ones capable of becoming hydrophilic and ones showing slow solubility (being dissolved gradually), specifically sodium pyrophosphate and the like. As the method of antiadhesive agent application, there may be mentioned the method comprising filling the polymerization vessel with an aqueous solution of the antiadhesive agent and, about 3 hours of treatment at 90° C., washing the vessel with water.

The fluorocopolymer of the invention is preferably one obtained by carrying out the polymerization by feeding a polymerization initiator into the liquid phase while avoiding the adhesion thereof to the polymerization vessel side wall and by thereby initiating the polymerization reaction. By feeding the polymerization initiator into the liquid, it becomes possible to suppress the polymerization on the polymerization vessel side wall portion in contact with the gaseous phase and, accordingly, the formation of components greatly differing in molecular weight and composition from the desired fluorocopolymer can be suppressed, with the result that the fluorocopolymer can be obtained in a form giving a reduced number of fisheyes. As the method of feeding into the liquid, there may be mentioned, for example, the method comprising providing the polymerization vessel with an insert pipe so that the tip thereof may be immersed in the liquid, and feeding the polymerization initiator through the insert pipe.

The fluorocopolymer of the invention can be obtained in the form of a powder or pellets, for instance, preferably in a form melt-pelletized using a twin-screw extruder. The use of a twin-screw extruder makes it easy for non-compatible components causative of fisheyes to be ground by the screws. As a result, the number of fisheyes large in size can be reduced.

The fluorocopolymer of the invention is preferably one melt-pelletized using a twin-screw extruder provided, between the screws and the die, with a screen prepared by putting a plurality of meshes (#300 or higher) on one another or with a filter (50 μm or finer). By removing contamination contained in the fluorocopolymer using a fine screen or filter, it becomes possible to obtain the fluorocopolymer giving a reduced number of fisheyes. The extruder mentioned above is more preferably provided with a 50-μm or finer filter.

The fluorocopolymer of the invention, which has the constitution described hereinabove, is advantageous in that it can be used in the manufacture of electric wires and, even in the case of manufacturing AWG 40 or thinner electric wires, in particular, can reduce the occurrence of molding faults and can give electric wires the covering of which has desirable properties.

A method of producing electric wires comprising extrusion-molding the above-mentioned fluorocopolymer on a cable conductor also constitutes an aspect of the present invention. The electric wire production method of the invention comprises extrusion-molding the fluorocopolymer having the constitution described hereinabove and, therefore, hardly causes molding faults even in extrusion molding. As the material of the cable conductor mentioned above, there may be mentioned copper wires, silver-plated wires and nickel-plated wires.

An electric wire characterized in that the above-mentioned fluorocopolymer is used therein also constitutes an aspect of the present invention. The electric wire of the invention, in which the fluorocopolymer having the constitution described hereinabove is used, is excellent in crack resistance.

The electric wire of the invention whose diameter (gauge) is preferably not thicker than AWG 20 wire, more preferably not thicker than AWG 40 wire. The AWG numbers given above are based on the American Wire Gauge [AWG] standard; AWG 20 refers to a diameter of 0.813 mm and AWG 40 refers to a diameter of 0.079 mm.

The electric wire of the invention can be suitably used as an electric wire in personal computers, mobile phones, video cameras, GPS devices and other information and telecommunication devices and machines as well as endoscopes and other medical devices and instruments, among others, and can also cope with the miniaturization of mobile phones and other mobile devices. Notebook-size personal computers and mobile phones, which are foldable, have structural restrictions in the fold, or folding part, and, the use of a thin electric wire is also required; the electric wire of the invention can suitably be used therein. The electric wire of the invention can suitably be used also in image transmission lines in video microscopes for medical use.

Effects of the Invention

The fluorocopolymer of the invention, which has the constitution described hereinabove, can reduce the incidence of molding faults in electric wire covering molding and improve the crack resistance of the electric wire obtained. The electric wire production method of the invention can markedly reduce the incidence of molding faults in electric wire covering molding. The electric wire of the invention is excellent in crack resistance.

BEST MODES FOR CARRYING OUT THE INVENTION

The following examples, inclusive of comparative examples, illustrate the invention in further detail. These examples and comparative examples are, however, by no means limitative of the scope of the invention.

The measurements made in each example or comparative example were carried out by the following methods.
Measurement of Number of Fisheyes
The film molding and measurement were carried out in a class 1000 clean room [not more than 1000 fine particles not smaller than 0.5 μm per ft³ (cubic foot) of air] with greatest care to avoid contamination with such contamination as dust or refuse.

(1) Film Molding Conditions
Each film molding was carried out using a ø20 extruder (product of Tanabe Plastics Machinery) equipped with a T die under the following conditions: preset temperatures: C1: 350° C., C2: 390° C., C3: 390° C., D: 390° C.; screw revolution speed: 15 rpm; take-off speed: about 3 m/min. The take-off speed was finely adjusted so that a film width of 70 mm and a film thickness (middle portion) of 0.05 to 0.06 mm might be obtained. Sampling was started 30 minutes after the start of molding, and three film samples with a length of 5 m were collected.
(2) Fisheye Number Measurement Conditions
The film obtained was masked on both ends and the 50-mm-wide middle portion was subjected to fisheye detection using a surface testing apparatus (product of Mitsubishi Rayon: LSC-3100V).

Two detectors were used for fisheye detection; one (detector 1) was disposed 292 mm vertically above the film while the lamp was disposed, on the opposite side of the film relative to the detector, 300 mm below the film; the other detector (detector 2) was disposed 292 mm vertically above the film while the lamp was disposed, on the opposite side of the film relative to the detector, 50 mm below the film. Light emitted from each lamp and transmitted through the film was detected by each detector so that parts showing a transmittance lower than 80% might be detected. Those parts detected by the detector 1 but not detected by the detector 2 were regarded as fisheyes.

The reason why two detectors differing in lamp position were used for fisheye detection is that fisheyes as well as contamination sites other than fisheyes appear dark (showing decreases in transmittance) when the distance between the lamp and film is long whereas, when that distance is short, contamination sites other than fisheyes appear dark but fisheyes look transparent (causing no decrease in transmittance); when this fact is utilized, fisheyes alone can be detected.

The fisheyes detected were measured for size determination. The number of fisheyes with a side length not shorter than 44 μm but shorter than 178 μm was obtained by counting fisheyes capable of enclosing a square with a side length of 44 μm and incapable of enclosing a square with a side length of 178 μm. The number of fisheyes with a side 178 μm or longer was obtained by counting fisheyes capable of enclosing a square with a side length of 178 μm. The mass of the film used for measurement was measured and each number of fisheyes was converted to the number per 100 g. Three films were used for fisheye counting, and the mean values were calculated and employed as the numbers of both classes of fisheyes given by the fluorocopolymer.
Measurement of Number of Protrusions Formed on Electric Wire Surface
(1) Electric Wire Covering Molding Conditions
Using a ø20 extruder (product of Tanabe Plastics Machinery), AWG 40 electric wires (core diameter: 0.079 mm) were obtained under the following conditions: preset temperatures: C1: 300° C., C2: 330° C., C3: 360° C., D: 370° C.; screw speed: 5 rpm; extrusion rate: about 40 m/minute; covering thickness: 0.040 mm.
(2) Protrusion Occurrence Measurement Conditions
The electric wire diameters in the x-axis and y-axis directions were continuously measured using an outside diameter measuring apparatus. The sites having an electric wire diameter value of 0.200 mm or higher were regarded as having protrusions, hence they were counted.

Electric Wire Thermal Crack Resistance (Mandrell Crack) Test

Twenty 20-cm-long electric wire segments were cut out from each electric wire obtained and used as electric wires (test specimens) for crack testing. These test specimens, in a straight condition, were heat-treated at 230° C. for 96 hours. The test specimens were taken out, cooled at room temperature and coiled around an electric wire having the same diameter as the test specimens. The whole was again subjected to 2 hours of heat treatment at 230° C., then taken out and cooled at room temperature; the test specimens were examined by visual examination and under a magnifying lens, and the test specimen electric wires that had cracked were counted.

Measurement of MFR of Fluorocopolymer

Using a melt index tester conforming to ASTM D 1238-98 or JIS K 7210 and a die with a diameter of 2.1 mm and a length of 8 mm, about 6 g of each specimen was subjected to MFR measurement at 372° C. under a load of 5 kg (sum of the piston and the weight).

Measurement of Number of Terminal Groups of Fluorocopolymer

Each fluorocopolymer in powder form was compression-molded at 350° C. for 30 minutes to give a 0.25 to 0.3-mm-thick film. This film was subjected to infrared absorption spectrometry, and the spectrum obtained was compared with infrared absorption spectra of known films for terminal group species identification; for each species, the number of terminal groups was calculated based on the corresponding difference spectrum.

Each infrared absorption spectrum was measured and analyzed using FT-IR Spectrometer 1760X (product of Perkin-Elmer) and Perkin Elmer Spectrum for Windows (registered trademark) version: 1.4 C.

Measurement of Fluorocopolymer Monomer Mass Ratio

The TFE unit, HFP unit and PAVE unit contents were respectively measured using an NMR spectrometer (product of Bruker BioSpin, AC300) or an infrared absorption spectrometer (product of Perkin-Elmer, model 1760), and the mass ratio therebetween was calculated.

Example 1

A 1000-liter glass-lined vertical autoclave equipped with a stirrer was charged with 800 kg of a 1% aqueous solution of sodium pyrophosphate and, after 3 hours of treatment at 90° C., washed with water. Then, the autoclave was charged with 270 kg of pure water and 0.1 kg of ammonium ω-hydroxy-fluorocarboxylate and, after three repetitions of a procedure comprising internal space substitution with nitrogen and evacuation, 211 kg of monomeric HFP and 2.66 kg of monomeric PPVE were fed into the autoclave in a vacuum condition.

Stirring was started, the polymerization vessel temperature was set at 28.0° C., and the pressure was raised to 0.89 MPaG by feeding monomeric TFE. Then, 4.0 kg of di(ω-hydrodecafluoroheptanoyl) peroxide (hereinafter referred to as "DHP") diluted to about 8% by mass with perfluorohexane was fed into the liquid phase through an insert pipe sufficient in length for direct feeding into the liquid. The reaction was immediately initiated.

During the reaction, TFE was additionally fed to maintain the autoclave inside pressure at 0.89 MPaG. From the start of the reaction, 0.73 kg of PPVE was additionally fed at each of the points of time corresponding to 20%, 40% and 60% consumptions of TFE; DHP was additionally fed 2 and 4 hours from the start of the reaction, each time in an amount of 4.0 kg, DHP was further fed 6, 8 and 10 hours from the start of the reaction, each time in an amount of 2.0 kg and, thereafter, 1.0 kg of DHP was additionally fed at 3-hour intervals. Further, 5 hours from the start of the reaction, 5 kg of methanol was added.

The reaction was continued in that manner for 52 hours and, then, the unreacted TFE and HFP monomers were discharged; a granular powder was thus obtained. Pure water was added to the powder and, after stirring for washing, the powder was taken out of the autoclave. After 24 hours of drying at 150° C., 340 kg of a fluorocopolymer was obtained. The TFE:HFP:PPVE mass ratio in the copolymer obtained was 86.9:12.1:1.0 and the MFR was 38 g/10 minutes. Observation of the autoclave inside after discharge of the powder revealed little resin adhesion to the vessel wall or to the insert pipe.

The fluorocopolymer powder was melt-pelletized on a twin-screw extruder using a sintered filter (40 μm) made of Hastelloy. The MFR was 38 g/10 minutes, the number of fisheyes with a side not shorter than 44 μm but shorter than 178 μm was 1052/100 g and the number of fisheyes with a side 178 μm or longer was 455/100 g. Then, electric wire covering molding was carried out under the conditions mentioned above. The number of protrusions found per 10 km of the electric wire molded was 1. As a result of thermal crack resistance (mandrell crack) test of the electric wire molded, none of the electric wire specimens was found to have been cracked.

Example 2

A melt-pelletized copolymer was obtained in the same manner as in Example 1 except that a #300/#100/#300/#100/#50 mesh screen was used in lieu of the sintered filter (40 μm) in the step of pelletization. The MFR was 38 g/10 minutes, the number of fisheyes with a side not shorter than 44 μm but shorter than 178 μm was 9250/100 g and the number of fisheyes with a side 178 μm or longer was 813/100 g. Then, electric wire covering molding was carried out under the conditions mentioned above. The number of protrusions found per 10 km of the electric wire molded was 2. As a result of thermal crack resistance (mandrell crack) test of the electric wire molded, none of the electric wire specimens was found to have been cracked.

Example 3

Fluorination of Copolymer of Example 1

The melt-pelletized copolymer obtained in Example 1 was exposed to fluorine gas diluted to 25% with nitrogen at 180° C. for 12 hours to give a terminally fluorinated copolymer. The copolymer after fluorination had an MFR of 40 g/10 minutes. As for the terminal groups other than $CF_3$ groups, 12 COF groups per $10^6$ carbon atoms and 5 COOH groups per $10^6$ carbon atoms were found. Very thin electric wire covering molding was carried out under the conditions mentioned above. The number of fisheyes with a side not shorter than 44 μm but shorter than 178 μm was 314/100 g and the number of fisheyes with a side 178 μm or longer was 58/100 g. Then, electric wire covering molding was carried out under the conditions mentioned above. The number of protrusions found per 10 km of the electric wire molded was zero. As a result of thermal crack resistance (mandrell crack) test of the electric wire molded, none of the electric wire specimens was found to have been cracked.

Example 4

A 1000-liter glass-lined vertical autoclave equipped with a stirrer was charged with 800 kg of a 1% aqueous solution of sodium pyrophosphate and, after 3 hours of treatment at 90°

C., washed with water. Then, the autoclave was charged with 270 kg of pure water and 0.1 kg of ammonium ω-hydroxyfluorocarboxylate and, after three repetitions of a procedure comprising internal space substitution with nitrogen and evacuation, 233 kg of monomeric HFP was fed into the autoclave in a vacuum condition.

Stirring was started, the polymerization vessel temperature was set at 29.0° C., and the pressure was raised to 0.90 MPaG by feeding monomeric TFE. Then, 4.0 kg of DHP was fed into the liquid phase through an insert pipe sufficient in length for direct feeding into the liquid. The reaction was immediately initiated.

During the reaction, TFE was additionally fed to maintain the autoclave inside pressure at 0.90 MPaG. DHP was additionally fed 2 and 4 hours from the start of the reaction, each time in an amount of 4.0 kg, DHP was further fed 6, 8 and 10 hours from the start of the reaction, each time in an amount of 2.0 kg and, thereafter, 1.0 kg of DHP was additionally fed at 3-hour intervals. Further, 5 hours from the start of the reaction, 5 kg of methanol was added.

The reaction was continued in that manner for 52 hours and, then, the unreacted TFE and HFP monomers were discharged; a granular powder was thus obtained. Pure water was added to the powder and, after stirring for washing, taken out of the autoclave. After 24 hours of drying at 150° C., 340 kg of a fluorocopolymer was obtained. The TFE:HFP mass ratio in the copolymer obtained was 85.7:14.3 and the MFR was 42 g/10 minutes. Observation of the autoclave inside after discharge of the powder revealed little resin adhesion to the vessel wall or to the insert pipe.

The fluorocopolymer powder was melt-pelletized on a twin-screw extruder using a sintered filter (40 μm) made of Hastelloy. The MFR was 45 g/10 minutes, the number of fisheyes with a side not shorter than 44 μm but shorter than 178 μm was 1844/100 g and the number of fisheyes with a side 178 μm or longer was 623/100 g. Then, electric wire covering molding was carried out under the conditions mentioned above. The number of protrusions found per 10 km of the electric wire molded was 1. As a result of thermal crack resistance (mandrell crack) test of the electric wire molded, none of the electric wire specimens was found to have been cracked.

Example 5

Fluorination of Copolymer of Example 4

The melt-pelletized copolymer obtained in Example 4 was exposed to fluorine gas diluted to 25% with nitrogen at 180° C. for 12 hours to give a terminally fluorinated copolymer. The copolymer after fluorination had an MFR of 47 g/10 minutes. As for the terminal groups other than $CF_3$ groups, 18 COF groups per $10^6$ carbon atoms and 9 COON groups per $10^6$ carbon atoms were found. Very thin electric wire covering molding was carried out under the conditions mentioned above. The number of fisheyes with a side not shorter than 44 μm but shorter than 178 μm was 812/100 g and the number of fisheyes with a side 178 μm or longer was 376/100 g. Then, electric wire covering molding was carried out under the conditions mentioned above. The number of protrusions found per 10 km of the electric wire molded was zero. As a result of thermal crack resistance (mandrell crack) test of the electric wire molded, none of the electric wire specimens was found to have been cracked.

Example 6

A 1000-liter glass-lined vertical autoclave equipped with a stirrer was charged with 800 kg of a 1% aqueous solution of sodium pyrophosphate and, after 3 hours of treatment at 90° C., washed with water. Then, the autoclave was charged with 200 kg of pure water and, after three repetitions of a procedure comprising internal space substitution with nitrogen and evacuation, 175 kg of perfluorocyclobutane, 5.60 kg of monomeric PPVE and 25 kg of methanol were fed into the autoclave in a vacuum condition.

Stirring was started, the polymerization vessel temperature was set at 35.0° C., and the pressure was raised to 0.60 MPaG by feeding monomeric TFE. Then, 0.34 kg of di-n-propyl peroxydicarbonate diluted to about 50% by mass with methanol was fed into the liquid phase through an insert pipe sufficient in length for direct feeding into the liquid. The reaction was immediately initiated.

During the reaction, TFE was additionally fed to maintain the autoclave inside pressure at 0.60 MPaG. After the start of the reaction, 0.38 kg of PPVE was additionally fed at 1-hour intervals.

The reaction was continued in that manner for 28 hours and, then, the unreacted TFE monomer was discharged; a granular powder was thus obtained. Pure water was added to the powder and, after stirring for washing, taken out of the autoclave. After 24 hours of drying at 150° C., 184 kg of a PFA copolymer was obtained. The TFE:PPVE mass ratio in the copolymer obtained was 94.5:5.5 and the MFR was 60 g/10 minutes. Observation of the autoclave inside after discharge of the powder revealed little resin adhesion to the vessel wall or to the insert pipe.

The copolymer powder was melt-pelletized using a sintered filter (40 μm) made of Hastelloy. The MFR was 60 g/10 minutes, the number of fisheyes with a side not shorter than 44 μm but shorter than 178 μm was 7254/100 g and the number of fisheyes with a side 178 μm or longer was 837/100 g. Then, electric wire covering molding was carried out under the conditions mentioned above. The number of protrusions found per 10 km of the electric wire molded was 2. As a result of thermal crack resistance (mandrell crack) test of the electric wire molded, none of the electric wire specimens was found to have been cracked.

Example 7

Fluorination of Copolymer of Example 6

The melt-pelletized copolymer obtained in Example 6 was exposed to fluorine gas diluted to 25% with nitrogen at 200° C. for 12 hours to give a terminally fluorinated copolymer. The copolymer after fluorination had an MFR of 61 g/10 minutes. As for the terminal groups other than $CF_3$ groups, 15 COF groups per $10^6$ carbon atoms, 5 COOH groups per $10^6$ carbon atoms and 8 $CH_2OH$ groups per $10^6$ carbon atoms were found. Very thin electric wire covering molding was carried out under the conditions mentioned above. The number of fisheyes with a side not shorter than 44 μm but shorter than 178 μm was 3933/100 g and the number of fisheyes with a side 178 μm or longer was 766/100 g. Then, electric wire covering molding was carried out under the conditions mentioned above. The number of protrusions found per 10 km of the electric wire molded was 1. As a result of thermal crack resistance (mandrell crack) test of the electric wire molded, none of the electric wire specimens was found to have been cracked.

Example 8

A 1000-liter glass-lined vertical autoclave equipped with a stirrer was charged with 800 kg of a 1% aqueous solution of sodium pyrophosphate and, after 3 hours of treatment at 90° C., washed with water. Then, the autoclave was charged with 200 kg of pure water and, after three repetitions of a procedure comprising internal space substitution with nitrogen and evacuation, 175 kg of perfluorocyclobutane, 5.60 kg of monomeric PPVE and 20 kg of methanol were fed into the autoclave in a vacuum condition.

Stirring was started, the polymerization vessel temperature was set at 35.0° C., and the pressure was raised to 0.60 MPaG by feeding monomeric TFE. Then, 0.34 kg of di-n-propyl peroxydicarbonate diluted to about 50% by mass with methanol was fed into the liquid phase through an insert pipe sufficient in length for direct feeding into the liquid. The reaction was immediately initiated.

During the reaction, TFE was additionally fed to maintain the autoclave inside pressure at 0.60 MPaG. After the start of the reaction, 0.38 kg of PPVE was additionally fed at 1-hour intervals.

The reaction was continued in that manner for 23 hours and, then, the unreacted TFE monomer was discharged; a granular powder was thus obtained. Pure water was added to the powder and, after stirring for washing, taken out of the autoclave. After 24 hours of drying at 150° C., 192 kg of a PFA copolymer was obtained. The TFE:PPVE mass ratio in the copolymer obtained was 94.8:5.2 and the MFR was 43 g/10 minutes. Observation of the autoclave inside after discharge of the powder revealed little resin adhesion to the vessel wall or to the insert pipe.

The copolymer powder was melt-pelletized using a sintered filter (40 μm) made of Hastelloy. The MFR was 43 g/10 minutes, the number of fisheyes with a side not shorter than 44 μm but shorter than 178 μm was 2480/100 g and the number of fisheyes with a side 178 μm or longer was 655/100 g. Then, electric wire covering molding was carried out under the conditions mentioned above. The number of protrusions found per 10 km of the electric wire molded was 1. As a result of thermal crack resistance (mandrell crack) test of the electric wire molded, none of the electric wire specimens was found to have been cracked.

Example 9

A 1000-liter glass-lined vertical autoclave equipped with a stirrer was charged with 800 kg of a 1% aqueous solution of sodium pyrophosphate and, after 3 hours of treatment at 90° C., washed with water. Then, the autoclave was charged with 270 kg of pure water and 0.1 kg of ammonium ω-hydroxyfluorocarboxylate and, after three repetitions of a procedure comprising internal space substitution with nitrogen and evacuation, 211 kg of monomeric HFP and 2.66 kg of monomeric PPVE were fed into the autoclave in a vacuum condition.

Stirring was started, the polymerization vessel temperature was set at 28.0° C., and the pressure was raised to 0.94 MPaG by feeding monomeric TFE. Then, 4.0 kg of DHP was fed into the liquid phase through an insert pipe. The reaction was immediately initiated.

During the reaction, TFE was additionally fed to maintain the autoclave inside pressure at 0.89 MPaG. From the start of the reaction, 0.73 kg of PPVE was additionally fed at each of the points of time corresponding to 20%, 40% and 60% consumptions of TFE; DHP was additionally fed 2 and 4 hours from the start of the reaction, each time in an amount of 4.0 kg, DHP was further fed 6, 8 and 10 hours from the start of the reaction, each time in an amount of 2.0 kg and, thereafter, 1.0 kg of DHP was additionally fed at 3-hour intervals. Further, 5 hours from the start of the reaction, 7 kg of methanol was added.

The reaction was continued in that manner for 48 hours and, then, the unreacted TFE and HFP monomers were discharged; a granular powder was thus obtained. Pure water was added to the powder and, after stirring for washing, taken out of the autoclave. After 24 hours of drying at 150° C., 329 kg of a fluorocopolymer was obtained. The TFE:HFP:PPVE mass ratio in the copolymer obtained was 89.1:10.1:0.8 and the MFR was 42 g/10 minutes.

The fluorocopolymer powder was melt-pelletized using a sintered filter (40 μm) made of Hastelloy. The MFR was 42 g/10 minutes, the number of fisheyes with a side not shorter than 44 μm but shorter than 178 μm was 5623/100 g and the number of fisheyes with a side 178 μm or longer was 524/100 g. Then, electric wire covering molding was carried out under the conditions mentioned above. The number of protrusions found per 10 km of the electric wire molded was zero. As a result of thermal crack resistance (mandrell crack) test of the electric wire molded, two electric wire specimens were found to have been cracked.

Comparative Example 1

The polymerization procedure of Example 1 was followed in the same manner except that the treatment of the polymerization vessel autoclave with a 1% aqueous solution of sodium pyrophosphate was omitted and the DHP was fed into the gaseous phase using an insert pipe insufficient in length for direct feeding thereof into the liquid phase. The reaction was carried out for 50 hours and, then, the unreacted TFE and HFP monomers were discharged; a granular powder was thus obtained. Pure water was added to the powder and, after stirring for washing, taken out of the autoclave. After 24 hours of drying at 150° C., 340 kg of a fluorocopolymer was obtained. Observation of the autoclave inside after discharge of the powder revealed abundant resin adhesion to the vessel wall and the insert pipe.

The TFE:HFP:PPVE mass ratio in the copolymer obtained was 86.9:12.1:1.0 and the MFR was 38 g/10 minutes. When this copolymer powder was subjected to melt-pelletization using a Hastelloy sintered filter (40 μm), the resin pressure rose abnormally, leading to failure in pelletization.

Comparative Example 2

The fluorocopolymer powder prepared in Comparative Example 1 was pelletized using a #300/#100/#300/#100/#50 mesh screen. The MFR was 38 g/10 minutes, the number of fisheyes with a side not shorter than 44 μm but shorter than 178 μm was 11926/100 g and the number of fisheyes with a side 178 μm or longer was 1470/100 g. Then, electric wire covering molding was carried out under the conditions mentioned above. The number of protrusions found per 10 km of the electric wire molded was 7. As a result of thermal crack resistance (mandrell crack) test of the electric wire molded, none of the electric wire specimens was found to have been cracked.

Comparative Example 3

The fluorocopolymer powder prepared in Comparative Example 1 was pelletized using a #100/#100/#50 mesh screen. The MFR was 38 g/10 minutes, the number of fisheyes with a side not shorter than 44 μm but shorter than 178 μm was 21395/100 g and the number of fisheyes with a side 178 μm or longer was 2132/100 g. Then, electric wire covering molding was carried out under the conditions mentioned above. The number of protrusions found per 10 km of the electric wire molded was 42. During the molding, melt fracture occurred twice, hence the molding could not be continued. As a result of thermal crack resistance (mandrell crack) test of the electric wire molded, four electric wire specimens were found to have been cracked.

Comparative Example 4

Synthesis Example 1 in International Publication WO 2005/052015

The polymerization procedure described in Synthesis Example 1 in WO 2005/052015 was followed. The TFE:PPVE mass ratio in the copolymer obtained was 94.5:5.5 and the MFR was 60 g/10 minutes. In this procedure including neither the antiadhesive agent application nor the polymerization initiator addition using an insert pipe, observation of the autoclave inside after discharging revealed abundant resin adhesion to the vessel wall and the insert pipe.

The fluorocopolymer powder prepared was pelletized using a #300/#100/#300/#100/#50 mesh screen. The MFR was 60 g/10 minutes, the number of fisheyes with a side not shorter than 44 μm but shorter than 178 μm was 18646/100 g and the number of fisheyes with a side 178 μm or longer was 1611/100 g. Then, electric wire covering molding was carried out under the conditions mentioned above. The number of protrusions found per 10 km of the electric wire molded was 11. As a result of thermal crack resistance (mandrell crack) test of the electric wire molded, none of the electric wire specimens was found to have been cracked.

The data obtained in the above examples and comparative examples are shown in Table 1.

INDUSTRIAL APPLICABILITY

The fluorocopolymer of the invention can suitably be used in the manufacture of electric wires. The electric wire of the invention can suitably be used as an electric wire in personal computers, mobile phones, video cameras, GPS devices and other information and telecommunication devices and machines as well as endoscopes and other medical devices and instruments, among others.

The invention claimed is:

1. A fluorocopolymer comprising tetrafluoroethylene-derived constituent unit as essential unit, and hexafluoropropylene-derived constituent unit and/or perfluoro(alkyl vinyl ether)-derived constituent unit,
   wherein, when the fluorocopolymer is molded into a film,
   the film has not more than 10000 fisheyes capable of enclosing a square with a side length of 44 μm and incapable of enclosing a square with a side length of 178 μm per 100 g and not more than 1000 fisheyes capable of enclosing a square with a side length of 178 μm per 100 g.

2. The fluorocopolymer according to claim 1, which has a melt flow rate of not lower than 25 g/10 minutes but lower than 48 g/10 minutes.

TABLE 1

|  | Example 1 | Example 2 | Example 3 | Example 4 | Example 5 | Example 6 | Example 7 |
|---|---|---|---|---|---|---|---|
| Copolymer composition (mass ratio) | | | | | | | |
| TFE | 86.9 | 86.9 | 86.9 | 85.7 | 85.7 | 94.5 | 94.5 |
| HFP | 12.1 | 12.1 | 12.1 | 14.3 | 14.3 | 0 | 0 |
| PPVE | 1.0 | 1.0 | 1.0 | 0 | 0 | 5.5 | 5.5 |
| MFR (g/10 min) | 38 | 38 | 40 | 45 | 47 | 60 | 61 |
| Number of fisheyes (per 100 g) | | | | | | | |
| 44 μm ≦ side < 178 μm | 1052 | 9250 | 314 | 1844 | 812 | 7254 | 3933 |
| 178 μm ≦ side | 455 | 813 | 58 | 623 | 376 | 837 | 766 |
| Protrusions upon electric wire molding (number/10 km) | 1 | 2 | 0 | 1 | 0 | 2 | 1 |
| Cracks upon coiling crack testing (number/20 specimens) | 0 | 0 | 0 | 0 | 0 | 0 | 0 |

|  | Example 8 | Example 9 | Comparative example 1 | Comparative example 2 | Comparative example 3 | Comparative example 4 |
|---|---|---|---|---|---|---|
| Copolymer composition (mass ratio) | | | | | | |
| TFE | 94.8 | 89.1 | 86.9 | 86.9 | 86.9 | 94.5 |
| HFP | 0 | 10.1 | 12.1 | 12.1 | 12.1 | 0 |
| PPVE | 5.2 | 0.8 | 1.0 | 1.0 | 1.0 | 5.5 |
| MFR (g/10 min) | 43 | 42 | 38 | 38 | 38 | 60 |
| Number of fisheyes (per 100 g) | | | | | | |
| 44 μm ≦ side < 178 μm | 2480 | 5623 | — | 11926 | 21395 | 18646 |
| 178 μm ≦ side | 655 | 524 | — | 1470 | 2132 | 1611 |
| Protrusions upon electric wire molding (number/10 km) | 1 | 0 | — | 7 | 42 | 11 |
| Cracks upon coiling crack testing (number/20 specimens) | 0 | 2 | — | 0 | 4 | 0 |

3. The fluorocopolymer according to claim 1,
which is a copolymer comprising 90 to 80% by mass of tetrafluoroethylene units and 10 to 20% by mass of hexafluoropropylene units,
a copolymer comprising 97 to 90% by mass of tetrafluoroethylene units and 3 to 10% by mass of perfluoro(alkyl vinyl ether) units, or
a copolymer comprising 92 to 75% by mass of tetrafluoroethylene units, 7 to 20% by mass of hexafluoropropylene units and 0.1 to 5% by mass of perfluoro(alkyl vinyl ether) units.

4. The fluorocopolymer according to claim 1,
wherein the number of terminal groups other than —$CF_3$ groups is not greater than 50 per $10^6$ carbon atoms.

5. The fluorocopolymer according to claim 1,
wherein the number of fisheyes capable of enclosing a square with a side length of 44 μm and incapable of enclosing a square with a side length of 178 μm is not greater than 1000 per 100 g and the number of fisheyes capable of enclosing a square with a side length of 178 μm is not greater than 1000 per 100 g.

6. The fluorocopolymer according to claim 1,
wherein the perfluoro(alkyl vinyl ether) is perfluoro(propyl vinyl ether).

7. A method of producing an electric wire,
which comprises extrusion-molding the fluorocopolymer according to claim 1, on a cable conductor.

8. The electric wire having a covering made of the fluorocopolymer according to claim 1.

9. The electric wire according to claim 8,
whose diameter is not thicker than that of 20 AWG wire.

10. The electric wire according to claim 8,
whose diameter is not thicker than that of 40 AWG wire.

\* \* \* \* \*